United States Patent
Mitchell

(10) Patent No.: US 10,070,225 B1
(45) Date of Patent: *Sep. 4, 2018

(54) VEHICLE ENTERTAINMENT SYSTEM

(71) Applicant: VOXX INTERNATIONAL CORPORATION, Hauppauge, NY (US)

(72) Inventor: Ciaran Mitchell, Byfleet Surrey (GB)

(73) Assignee: VOXX INTERNATIONAL CORPORATION, Hauppauge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/720,842

(22) Filed: Sep. 29, 2017

Related U.S. Application Data

(63) Continuation-in-part of application No. 15/594,352, filed on May 12, 2017.

(51) Int. Cl.
| | | |
|---|---|---|
| *H04R 1/00* | (2006.01) | |
| *H04R 5/02* | (2006.01) | |
| *B60R 11/02* | (2006.01) | |
| *B60R 11/00* | (2006.01) | |
| *B60N 2/44* | (2006.01) | |
| *B60N 2/90* | (2018.01) | |

(52) U.S. Cl.
CPC .............. *H04R 5/023* (2013.01); *B60R 11/02* (2013.01); *B60N 2002/4405* (2013.01); *B60N 2002/905* (2018.02); *B60R 2011/008* (2013.01)

(58) Field of Classification Search
CPC ....................................................... H04R 1/00
See application file for complete search history.

(56) References Cited

U.S. PATENT DOCUMENTS

| | | | | |
|---|---|---|---|---|
| 7,643,645 B2 * | 1/2010 | Richards | ................ | H04R 5/023 381/374 |
| 9,452,718 B1 * | 9/2016 | Dry | ........................ | B60R 21/055 |
| 2006/0001307 A1 * | 1/2006 | Embach | ................ | B60N 2/4876 297/391 |
| 2008/0157574 A1 * | 7/2008 | LaRussa | ............... | B60N 2/4876 297/217.3 |
| 2011/0002478 A1 * | 1/2011 | Pollard | ................ | H04R 1/1041 381/74 |
| 2011/0215122 A1 * | 9/2011 | Osborne | ................... | B60R 7/04 224/275 |
| 2012/0140973 A1 * | 6/2012 | Olodort | ................ | H04R 1/1066 381/375 |
| 2015/0297003 A1 * | 10/2015 | Ahroon | ................ | A61B 6/5235 206/38 |

OTHER PUBLICATIONS

Office Action dated Sep. 14, 2017 for U.S. Appl. No. 15/594,352.
Notice of Allowance for U.S. Appl. No. 15/594,352 dated Feb. 12, 2018.

\* cited by examiner

*Primary Examiner* — Olisa Anwah
(74) *Attorney, Agent, or Firm* — F. Chau & Associates, LLC

(57) ABSTRACT

A vehicle entertainment system includes a headphones device and a vehicle headrest. The headphones device includes a first speaker disposed in a first speaker housing, a second speaker disposed in a second speaker housing, and a headband connecting the first speaker housing to the second speaker housing. The vehicle headrest includes a recessed channel shaped and dimensioned to receive the headband, the first speaker housing, and the second speaker housing.

16 Claims, 15 Drawing Sheets

US 10,070,225 B1

VEHICLE ENTERTAINMENT SYSTEM

CROSS-REFERENCE TO RELATED APPLICATIONS

This application is a Continuation-in-Part Application of U.S. application Ser. No. 15/594,352, filed on May 12, 2017, the disclosure of which is incorporated by reference herein in its entirety.

BACKGROUND

1. Technical Field

Exemplary embodiments of the present invention relate to a vehicle entertainment system, and more particularly, to a vehicle entertainment system including a headphones device and a vehicle headrest in which the headphones device can be docked.

2. Discussion of Related Art

As society becomes more mobile and therefore spends a greater amount of time traveling and away from home, demand rises for electronic devices outside the home environment. For example, vehicle entertainment units including video screens have been mounted in vehicle headrests, facilitating video entertainment on the road.

Wireless headphone devices are frequently utilized with vehicle entertainment systems so that a passenger using a vehicle entertainment system in a vehicle does not distract other passengers in the vehicle that are not using the vehicle entertainment system, and so that multiple passengers can utilize different vehicle entertainment systems outputting different audio streams within the same vehicle.

SUMMARY

According to an exemplary embodiment of the present invention, a vehicle entertainment system includes a headphones device and a vehicle headrest. The headphones device includes a wireless transceiver configured to wirelessly receive audio content from a media source disposed remote from the headphones device, a first speaker disposed in a first speaker housing, a second speaker disposed in a second speaker housing, and a headband connecting the first speaker housing to the second speaker housing. The audio content is output by the first speaker and the second speaker. The vehicle headrest includes a main body portion having a first side surface, a second side surface, and an upper surface extending from a first end of the first side surface to a first end of the second side surface. The vehicle headrest further includes a recessed channel disposed in the upper surface, the first side surface, and the second side surface of the main body portion. The recessed channel is shaped and dimensioned to receive the headband of the headphones device. The vehicle headrest further includes a first recessed headphone indentation disposed in the first side surface of the main body portion. The first recessed headphone indentation is shaped and dimensioned to receive the first speaker housing. The vehicle headrest further includes a second recessed headphone indentation disposed in the second side of the main body portion. The second recessed headphone indentation is shaped and dimensioned to receive the second speaker housing.

In an exemplary embodiment, the wireless transceiver is a BLUETOOTH transceiver, and the audio content is received from the media source via a BLUETOOTH connection established between the BLUETOOTH transceiver and the media source.

In an exemplary embodiment, the headphones device is configured to alternate between a single user audio mode and a multi-user audio mode. A minimum volume level and a maximum volume level at which the audio content is output by the first speaker and the second speaker are higher while in the multi-user audio mode than while in the single-user audio mode.

In an exemplary embodiment, the headphones device further includes a button. The headphones device is configured to alternate between the single user audio mode and the multi-user audio mode in response to the button being pressed.

In an exemplary embodiment, the vehicle entertainment system further includes a first electrical contact disposed on the headphones device, and a second electrical contact disposed on the vehicle headrest. The headphones device is configured to operate in the single user audio mode when the first and second electrical contacts are not in contact with each other, and operate in the multi-user audio mode when the first and second electrical contacts are in contact with each other.

In an exemplary embodiment, the vehicle entertainment system further includes a first short-range wireless communication transceiver disposed in the headphones device, and a second short-range wireless communication transceiver disposed in the vehicle headrest. The headphones device is configured to operate in the single user audio mode when a wireless connection is not established between the first and second short-range wireless communication transceivers, and operate in the multi-user audio mode when the wireless connection is established between the first and second short-range wireless communication transceivers.

In an exemplary embodiment, the vehicle headrest is configured to electrically connect to a power source of a vehicle, and further includes an inductive transmitter charging coil disposed in the main body portion. The headphones device further includes an internal battery and an inductive receiver charging coil. The internal battery is wirelessly charged via the inductive transmitter charging coil and the inductive receiver charging coil in response to the headphones device being docked in the vehicle headrest.

In an exemplary embodiment, the headphones device is configured to operate in the single user audio mode when the inductive receiver charging coil is not wirelessly coupled to the inductive transmitter charging coil, and operate in the multi-user audio mode when the inductive receiver charging coil is wirelessly coupled to the inductive transmitter charging coil.

In an exemplary embodiment, the vehicle entertainment system further includes a microphone disposed in at least one of the headphones device or the vehicle headrest. Voice data is transmitted from the at least one of the headphones device or the vehicle headrest to the media source.

In an exemplary embodiment, the headphones device further includes a first rotatable hinge connecting the first speaker housing to the headband, and a second rotatable hinge connecting the second speaker housing to the headband. The first speaker housing is configured to rotate toward a front of a vehicle and toward a rear of the vehicle via the first rotatable hinge while headphones device is docked in the vehicle headrest, and the second speaker housing is configured to rotate toward the front of the vehicle and toward the rear of the vehicle via the second rotatable hinge while the headphones device is docked in the vehicle headrest.

According to an exemplary embodiment of the present invention, a vehicle entertainment system includes a headphones device and a vehicle headrest. The headphones device includes a wireless transceiver configured to wirelessly receive audio content from a media source disposed remote from the headphones device, a first speaker disposed in a first speaker housing, a second speaker disposed in a second speaker housing, and a headband connecting the first speaker housing to the second speaker housing. The audio content is output by the first speaker and the second speaker. The vehicle headrest includes a recessed channel shaped and dimensioned to receive the headband, the first speaker housing, and the second speaker housing.

In an exemplary embodiment, a thickness of the headband is about equal to a depth of the recessed channel.

In an exemplary embodiment, an outer surface of the headband is substantially flush with an outer surface of the vehicle headrest while the headband is inserted into the recessed channel.

According to an exemplary embodiment of the present invention, a vehicle entertainment system includes a vehicle headrest. The vehicle headrest includes a main body portion having a first side surface, a second side surface, and an upper surface extending from a first end of the first side surface to a first end of the second side surface, a first speaker housing disposed in the first side surface, a first speaker disposed in the first speaker housing, a second speaker housing disposed in the second side surface, and a second speaker disposed in the second speaker housing. Audio content is output by the first speaker and the second speaker.

In an exemplary embodiment, the vehicle headrest further includes a wireless transceiver configured to wirelessly receive the audio content from a media source disposed remote from the vehicle headrest.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EXEMPLARY EMBODIMENTS

Figure 1A:
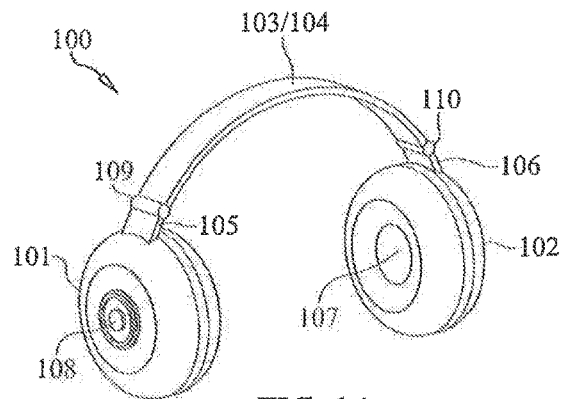
FIGS. 1A to 1C show a headphones device of a vehicle entertainment system according to exemplary embodiments of the present invention.

Exemplary embodiments of the present invention will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an exemplary embodiment may be described as a "second" element in another exemplary embodiment. In addition, as used herein, the singular forms "a", "an" and "the" are intended to include the plural forms as well, unless the context clearly indicates otherwise.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. For example, when one value is described as being about equal to another value, it is to be understood that the values are equal to each other to within a measurement error, or if measurably unequal, are close enough in value to be functionally equal to each other as would be understood by a person having ordinary skill in the art.

In addition, when two or more elements are described as being substantially flush with one another, it is to be understood that the elements are exactly flush with one another, or are almost flush with one another such that they appear to form the same plane. That is, it is to be understood that the elements are substantially even or level with one another within a measurement error. For example, when a headphones device is described as being substantially flush with a vehicle headrest, it is to be understood that the outer surface of the headphones device and the outer surface of the vehicle headrest are aligned with each other such that neither surface protrudes beyond the other surface. For example, when viewed from a profile, the headphones device does not visually protrude beyond the vehicle headrest.

According to exemplary embodiments of the present invention, a vehicle entertainment system includes a headphones device and a vehicle headrest into which the headphones device is docked. The headphones device may function as a typical headphones device, but may be specifically designed to be docked in the vehicle headrest. The headphones device may be a wireless headphones device or a wired headphones device.

Figure 1B:
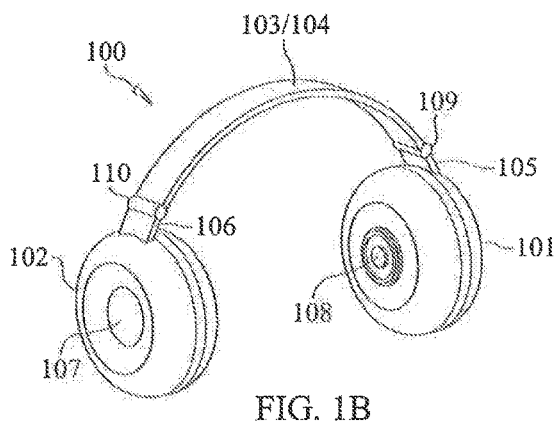
Figure 1C:
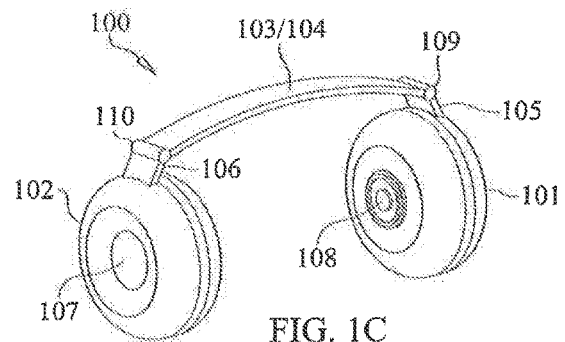
Figure 2A:
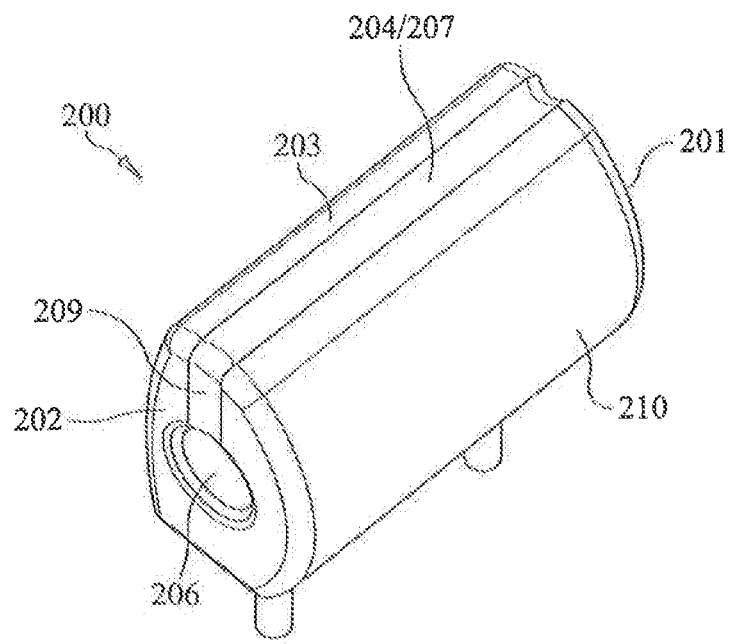
FIGS. 2A to 2D show a vehicle headrest of a vehicle entertainment system according to exemplary embodiments of the present invention.
Figure 2B:
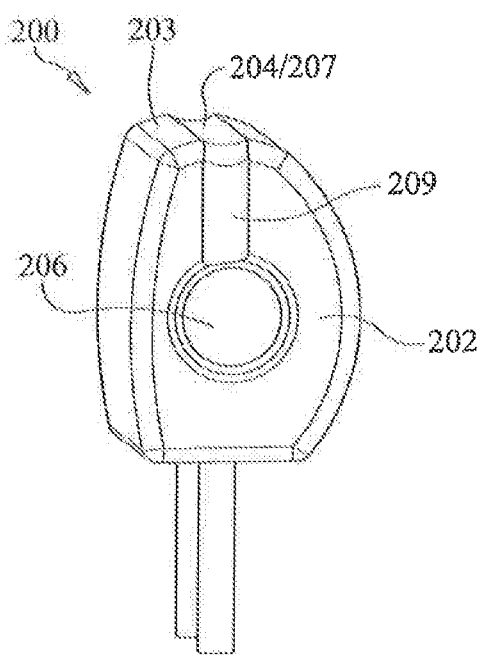
Figure 2C:
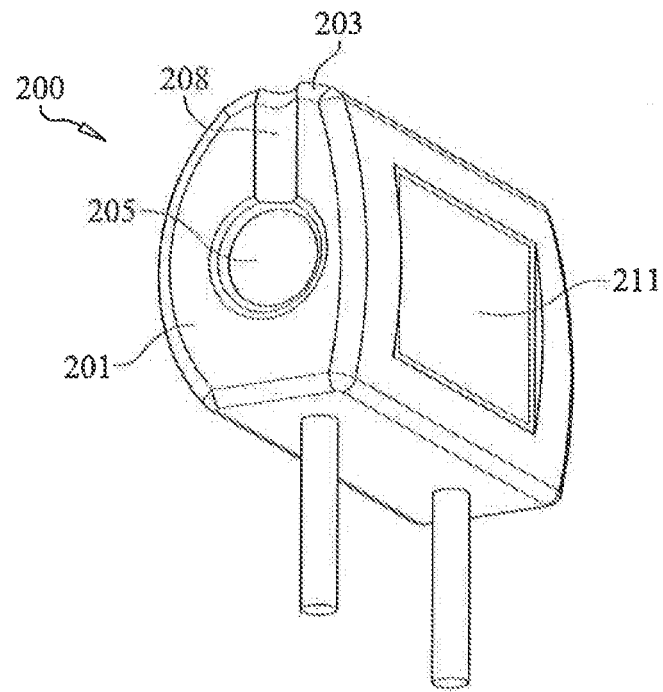
Figure 2D:
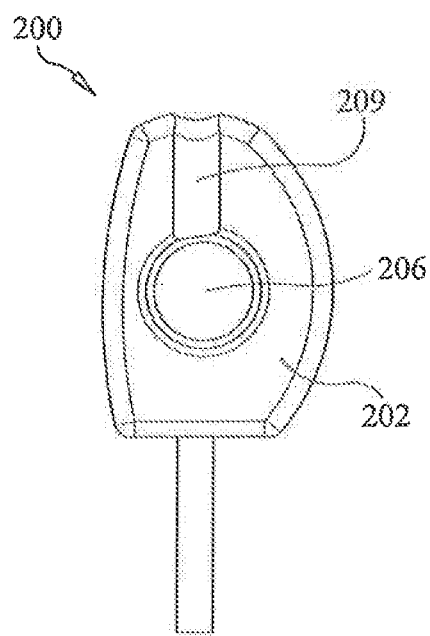

FIGS. 1A to 1C show a headphones device of a vehicle entertainment system according to exemplary embodiments of the present invention. FIGS. 2A to 2D show a vehicle headrest of a vehicle entertainment system according to exemplary embodiments of the present invention.

As shown in FIGS. 1A to 1C, a headphones device 100 according to exemplary embodiments of the present invention may include a first speaker disposed in a first speaker housing 101, a second speaker disposed in a second speaker housing 102, and a headband 103 connecting the first speaker housing 101 to the second speaker housing 102.

As shown in FIGS. 2A to 2D, a vehicle headrest 200 is shaped and dimensioned to receive the headphones device 100. For example, in an exemplary embodiment, the vehicle headrest 200 includes a main body portion 210 having a first side surface 201, a second side surface 202, and an upper surface 203. The upper surface 203 extends from a first end of the first side surface 201 to a first end of the second side surface 202. A recessed channel 204 is disposed in the upper surface 203, the first side surface 201, and the second side 202 surface of the main body portion 210. The recessed channel 204 is shaped and dimensioned to receive the headband 103 of the headphones device 100. The vehicle headrest 200 further includes a first recessed headphone indentation 205 disposed in the first side surface 201 of the main body portion 210, and a second recessed headphone indentation 206 is disposed in the second side 202 of the main body portion 210. The first recessed headphone indentation 205 is shaped and dimensioned to receive the first speaker housing 201 of the headphones device 100, and the second recessed headphone indentation 206 is shaped and dimensioned to receive the second speaker housing 102 of the headphones device 100.

In an exemplary embodiment, the thickness of the headband 103 of the headphones device 100 is about equal to the depth of the recessed channel 204 of the vehicle headrest 200, the thickness of the first speaker housing 101 is about equal to the depth of the first recessed headphone indentation 205 of the vehicle headrest 200, and the thickness of the second speaker housing 102 is about equal to the depth of the second recessed headphone indentation 206 of the vehicle headrest 200. As a result, when the headphones device 100 is docked in the vehicle headrest 200, the headphones device 100 is substantially flush with the vehicle headrest 200. For example, the outer surface of the headband 103 is substantially flush with the outer surface of the main body portion 210 while the headband 103 is inserted into the recessed channel 204, the outer surface of the first speaker housing 101 is substantially flush with the outer surface of the main body portion 210 while the first speaker housing 101 is inserted into the first recessed headphone indentation 205, and the outer surface of the second speaker housing 102 is substantially flush with the outer surface of the main body portion 210 while the second speaker housing 102 is inserted into the second recessed headphone indentation 206.

According to exemplary embodiments, the headband 103 may be made of a flexible material (e.g., a flexible plastic), allowing the headband 103 to flex between different positions such as when the headphones device 100 is worn by a user, and when the headphones device 100 is docked in the vehicle headrest 200. For example, in an exemplary embodiment, the shape of the headband 103 may conform to the shape of the recessed channel 204 in the vehicle headrest 200 when no flex is applied to the headphones device 100, and when worn by a user, the headband 103 may flex such that its shape conforms to the shape of the user's head.

The recessed channel 204 includes a first channel portion 207 disposed in the upper surface 203 of the main body portion 210, a second channel portion 208 disposed in the first side surface 201 of the main body portion 210, and a third channel portion 209 disposed in the second side surface 202 of the main body portion 210. As shown in FIGS. 2A to 2D, the second channel portion 208 and the third channel portion 209 respectively extend onto the first side surface 201 and the second side surface 202 from the first channel portion 207. That is, the first channel portion 207, the second channel portion 208, and the third channel portion 209 are connected to one another.

Referring again to FIGS. 1A to 1C, the headband 103 of the headphones device 100 includes an upper portion 104, a first side portion 105 having a first end connected to a first end of the upper portion 104 and a second end connected to the first speaker housing 101, and a second side portion 106 having a first end connected to a second end of the upper portion 104 and a second end connected to the second speaker housing 102.

According to exemplary embodiments of the present invention, the length of the upper portion 104 of the headband 103 is adjustable. For example, the length of the upper portion 104 may be adjustable in a direction that results in the first speaker housing 101 and the second speaker housing 102 moving closer to and further from one another. This allows the headphones device 100 to be adjusted to be in a docking position, in which the distance between the first speaker housing 101 and the second speaker housing 102 corresponds to the length of the vehicle headrest 200 between the first side 201 and the second side 202, allowing the headphones device 100 to be docked in the vehicle headrest 200. FIG. 1B shows the headband 103 of the headphones device 100 adjusted to be in a first position in which the headphones device 100 is worn by a user, and FIG. 1C shows the headband 103 of the headphones device 100 adjusted to be in a second position in which the length of the headband 103 is increased such that the headphones device 100 is in the docking position.

For example, in an exemplary embodiment, the width of the upper portion 104 of the headband 103 is about equal to the width of the first channel portion 207 of the vehicle headrest 200, and the thickness of the upper portion 104 of the headband 103 is about equal to the depth of the first channel portion 207. In addition, when the length of the headband 103 is adjusted such that the headphones device 100 is in the docking position, the length of the upper portion 104 of the headband 103 is about equal to the length of the first channel portion 207, the length of the first side portion 105 of the headband 103 is about equal to the length of the second channel portion 208, the width of the first side portion 105 is about equal to the width of the second channel portion 208, and the thickness of the first side portion 105 is about equal to the depth of the second channel portion 208. In addition, the length of the second side portion 106 of the headband 103 is about equal to the length of the third channel portion 209, the width of the second side portion 106 is about equal to the width of the third channel portion 209, and the thickness of the second side portion 106 is about equal to the depth of the third channel portion 209.

According to exemplary embodiments of the present invention, the periphery of the first recessed headphone indentation 205 in the vehicle headrest 200 is about equal to the periphery of the first speaker housing 101 of the headphones device 100, and the depth of the first recessed headphone indentation 205 is about equal to the thickness of the first speaker housing 101. Similarly, the periphery of the second recessed headphone indentation 206 is about equal to the periphery of the second speaker housing 102, and the depth of the second recessed headphone indentation 206 is about equal to the thickness of the second speaker housing 102.

Figure 3A:
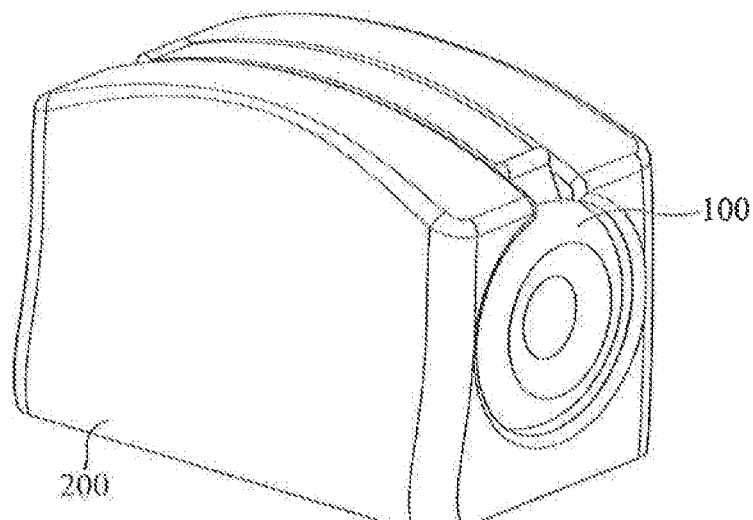
FIGS. 3A to 3C show a vehicle entertainment system including a headphones device and a vehicle headrest according to exemplary embodiments of the present invention.
Figure 3B:
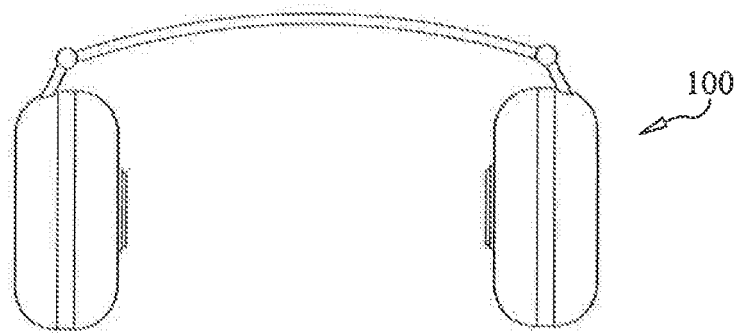
Figure 3B:
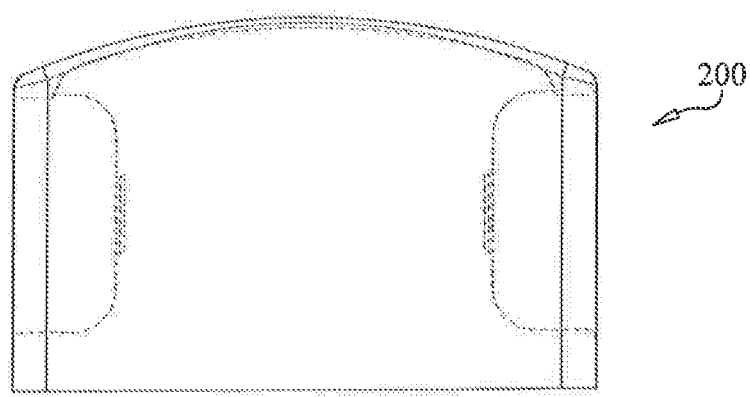
Figure 3C:
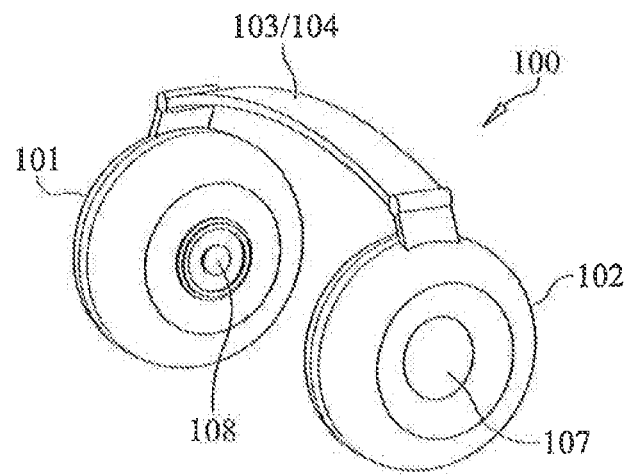
Figure 3C:
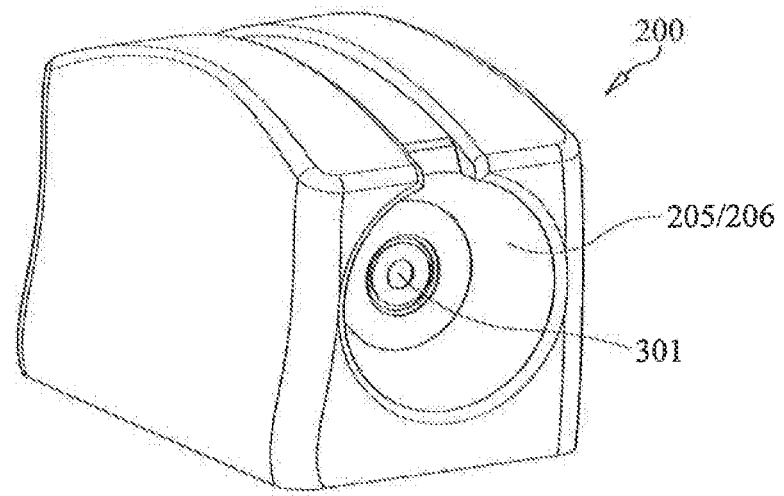

FIGS. 3A to 3C show a vehicle entertainment system including the headphones device and the vehicle headrest according to exemplary embodiments of the present invention.

As shown in FIGS. 3A to 3C, as a result of the above-described configuration of the headphones device 100 and the vehicle headrest 200, in exemplary embodiments, when docked, the outer surfaces of the headphones device 100 are substantially flush with the outer surfaces of the vehicle headrest 100. As a result, exemplary embodiments of the present invention provide a sleek and aesthetically pleasing vehicle entertainment system in which, when docked, the headphones device 100 fits within the vehicle headrest 200 such that it visually appears to be part of the interior trim of the vehicle. For example, when docked in the vehicle headrest 200, the headphones device 100 may not draw excessive attention from passengers in the vehicle, since the headphones device 100 does not protrude from the vehicle headrest 200, and appears to be part of the vehicle headrest 200.

According to exemplary embodiments of the present invention, the headphones device 100 is a wireless headphone device that includes an internal battery. In addition to providing a convenient and visually pleasing location in which the headphones device 100 can be mounted when not in use, the vehicle headrest 200 may also facilitate charging of the internal battery in the headphones device 100 when the headphones device 100 is docked.

Figure 5:
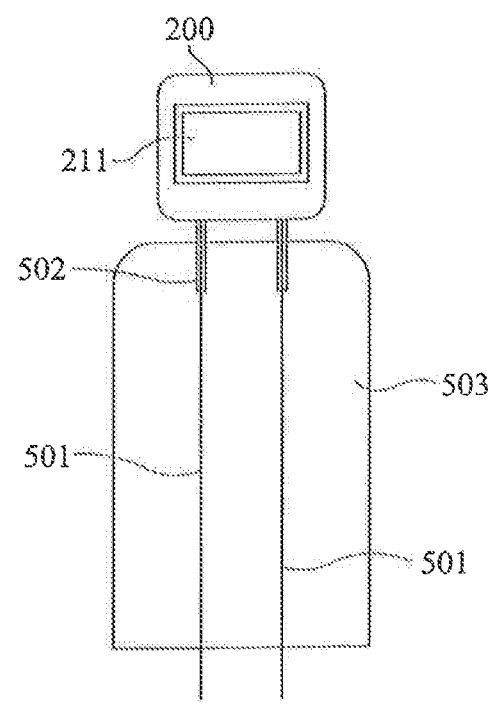
FIG. 5 shows a vehicle headrest of a vehicle entertainment system according to exemplary embodiments of the present invention.

For example, the vehicle headrest 200 may be electrically connected to a power source of the vehicle (see, for example, FIG. 5). The headphones device 100 may be charged via the vehicle headrest 200 in a variety of ways.

For example, in an exemplary embodiment, wireless charging may be utilized to charge the headphones device 100. In such an embodiment, the vehicle headrest 200 may include an inductive transmitter charging coil disposed in the main body 210 and connected to the vehicle's power source, and the headphones device 100 may include an inductive receiver charging coil disposed therein and connected to the internal batter of the headphones device 100.

The inductive receiver charging coil may be disposed in at least one of the first speaker housing 101 and the second speaker housing 102 of the headphones device 100, and the inductive transmitter charging coil may be disposed in the main body 210 of the vehicle headrest 200 in an area corresponding to at least one of the first recessed headphone indentation 205 and the second recessed headphone indentation 206. When the headphones device 100 is docked in the vehicle headrest 200, the inductive transmitter charging coil and the inductive receiver charging coil are placed in close proximity to each other, and the internal battery may be wirelessly charged via inductive charging facilitated by the coils. That is, the internal battery may be wireless charged via the inductive transmitter charging coil and the inductive receiver charging coil in response to the headphones device 100 being inserted into the recessed channel 204, the first recessed headphone indentation 205, and the second recessed headphone indentation 206 of the vehicle headrest 200.

The internal battery may be wirelessly charged via the inductive transmitter charging coil and the inductive receiver charging coil using a variety of wireless charging standards such as, for example, the QI standard or the POWER MATTERS ALLIANCE (PMA) standard. However, wireless charging is not limited thereto.

In an exemplary embodiment, instead of utilizing wireless charging facilitated by inductive coils, a first electrical contact may be disposed on the vehicle headrest 200, and a corresponding second electrical contact may be disposed on the headphones device 100. The first and second electrical contacts may be, for example, electrical contact pins that contact each other to facilitate charging of the internal battery of the headphones device 100 via the vehicle's power source. The first electrical contact may be connected to the vehicle's power source and disposed in at least one of the first recessed headphone indentation 205 and the second recessed headphone indentation 206, and the second electrical contact may be connected to the internal battery of the headphones device 100 and disposed on at least one of the first speaker housing 101 and the second speaker housing 102. When the headphones device 100 is docked in the vehicle headrest 200, the first electrical contact makes contact with and electrically connects to the second electrical contact, and the internal battery of the headphones device 100 is charged via the vehicle headrest 200 in response to the first electrical contact electrically connecting to the second electrical contact.

Herein, the inductive charging coils and the electrical contacts described above may be referred to as charging components. In addition, the sides of the speaker housings 101 and 102 that face inward toward each other and contact the user's head/ears when worn by the user may be referred to as inner sides of the speaker housings 101 and 102, and the opposite sides of the speaker housings 101 and 102 that do not contact the user's head/ears when worn by the user may be referred to as outer sides of the speaker housings 101 and 102.

According to exemplary embodiments of the present invention, the charging components described above may be included on one or both of the first speaker housing 101 and the second speaker housing 102, and in one or both of the first recessed headphone indentation 205 and the second recessed headphone indentation 206.

According to exemplary embodiments of the present invention, the charging components described above may be disposed on an inner side of at least one of the speaker housings 101 and 102, and/or on an outer side of at least one of the speaker housings 101 and 102.

For example, in an exemplary embodiment, the speakers are disposed on or near the inner sides of the speaker housings 101 and 102 such that they provide sound through the inner sides of the speaker housings 101 and 102, and a charging component(s) is disposed on or near the inner sides of the speaker housing 101 and/or 102. When the headphones device 100 is not in use, the headphones device 100 may be docked in the vehicle headrest 200 with the inner sides facing each other, as when worn by the user, and the charging component(s) in the headphones device 100 electrically connect to the charging component(s) disposed in the vehicle headrest 100 to charge the headphones device 100.

In an exemplary embodiment, the speakers are disposed on or near the inner sides of the speaker housings 101 and 102 such that they provide sound through the inner sides of the speaker housings 101 and 102, and the charging component(s) is disposed on or near the outer sides of the speaker housing 101 and/or 102. For example, as shown in FIGS. 1A to 1C, in an exemplary embodiment, the speakers 107 are disposed on or near the inner sides of the speaker housings 101 and 102, and a charging component (e.g., an inductive coil or electrical contacts) 108 is disposed on or near the outer side of the speaker housing 101. The headphones device 100 may include a first hinge 109 connecting the upper portion 104 of the headband 103 to the first side portion 105 of the headband 103, and a second hinge 110 connecting the upper portion 104 of the headband 103 to the second side portion 106 of the headband 103. The first side portion 105 of the headband 103 may fold inward toward the upper portion 104 of the headband 103 and outward away from the upper portion 104 of the headband 103 via the first hinge 109. Similarly, the second side portion 106 of the headband 103 may fold inward toward the upper portion 104 of the headband 103 and outward away from the upper portion 104 of the headband 103 via the second hinge 110 (see FIG. 4C).

As shown in FIG. 1B, the headphones device 100 may be inverted via the first and second hinges 109 and 110, resulting in the outer sides of the speaker housings 101 and 102 facing inward toward each other, and the inner sides of the speaker housings 101 and 102 facing outward. This allows the outer side of the speaker housing 101, which includes the charging component 108, to contact the vehicle headrest 200 when docked. For example, the hinges 109 and 110 may be pivoted about 180 degrees to transition the headphones device 100 between a listening position in which the inner sides of the speaker housings 101 and 102 including the speakers 107 face inward toward each other, and a docking position in which the outer sides of the speaker housings 101 and 102, at least one of which includes the charging component 108, face inward toward each other. As a result, when in the docking position, the headphones device 100 may be docked into the vehicle headrest 200 such that the charging component 108 disposed on the headphones device electrically connects to the charging component 301 disposed on the vehicle headrest (e.g., within a recessed headphone indentation 205/206) (see FIG. 3C).

According to exemplary embodiments, each of the headphones device 100 and the vehicle headrest 200 may include the inductive charging coils and the electrical contacts described above, allowing for multiple methods of charging the headphones device 100.

As shown in FIGS. 3A to 3C, the headphones device 100 is shaped and dimensioned to be docked in the recessed channel 204 of the vehicle headrest 200 such that the headphones device 100 is substantially flush with the vehicle headrest 200 when docked. This design provides a convenient and aesthetically pleasing way to store the headphones device 100 when not in use, resulting in the internal battery of the headphones device 100 maintaining its charge, and reducing the risk of the headphones device 100 being lost when not in use in the vehicle.

Figure 4A:
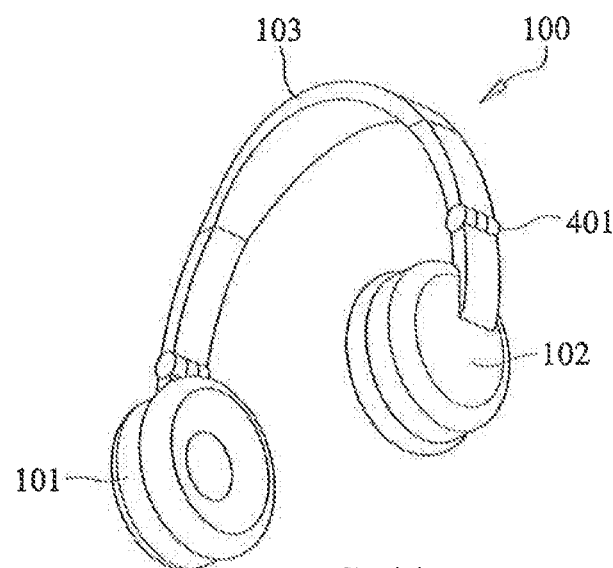
FIGS. 4A to 4C show a headphones device of a vehicle entertainment system according to exemplary embodiments of the present invention.
Figure 4B:
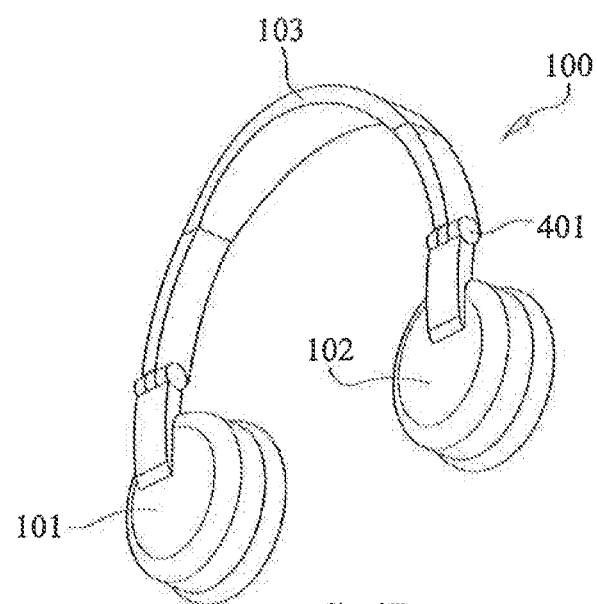
Figure 4C:
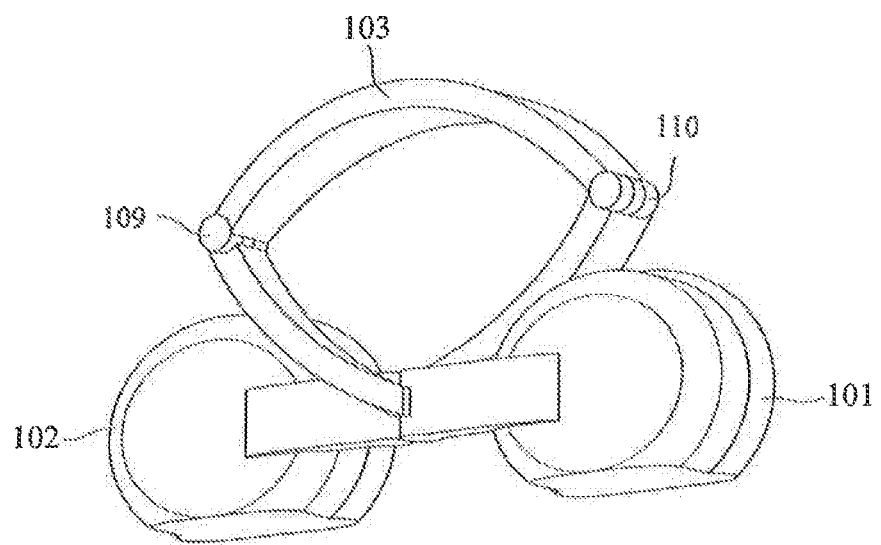

FIGS. 4A to 4C show a headphones device of a vehicle entertainment system according to exemplary embodiments of the present invention.

According to exemplary embodiments of the present invention, the headphones device 100 includes rotatable hinges 401 respectively connecting the first and second speaker housings 101 and 102 to the headband 103, allowing the headphones device 100 to transition between the positions illustrated in FIGS. 4A and 4B. For example, the rotatable hinges 401 allow the first and second speaker housings 101 and 102 to rotate relative to the headband 103 from the position shown in FIG. 4A to the position shown in FIG. 4B. Thus, the first and second speaker housings 101 and 102 may be folded flat, as shown in FIG. 4B. Referring to FIG. 4C, in an exemplary embodiment, the first and second speaker housings 101 and 102 may further fold inward via the first and second hinges 109 and 110, respectively, as described above.

Figure 4D:
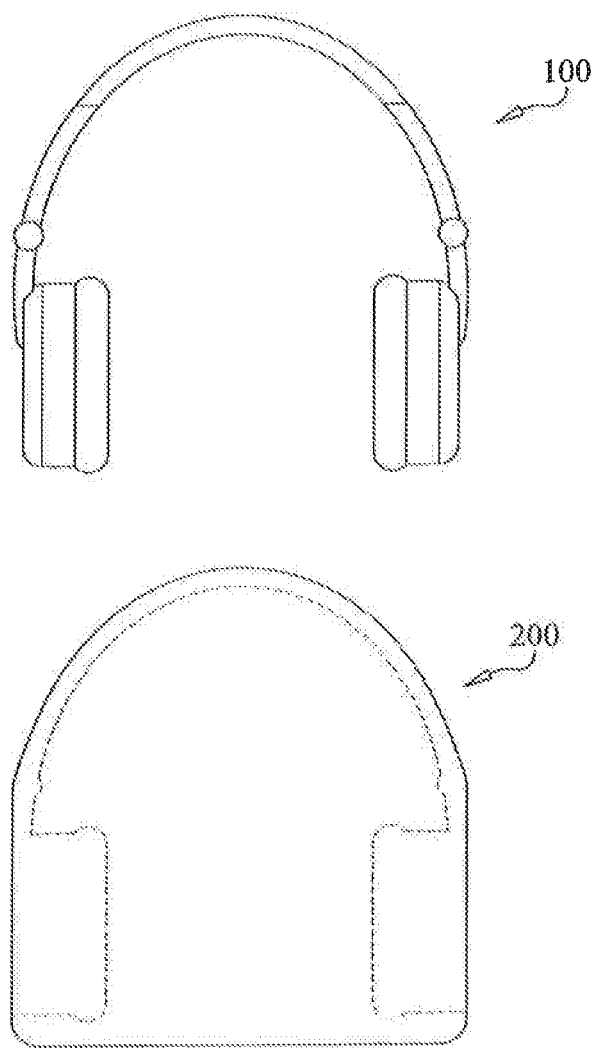
FIGS. 4D to 4F show a vehicle entertainment system including a headphones device and a vehicle headrest according to exemplary embodiments of the present invention.
Figure 4E:
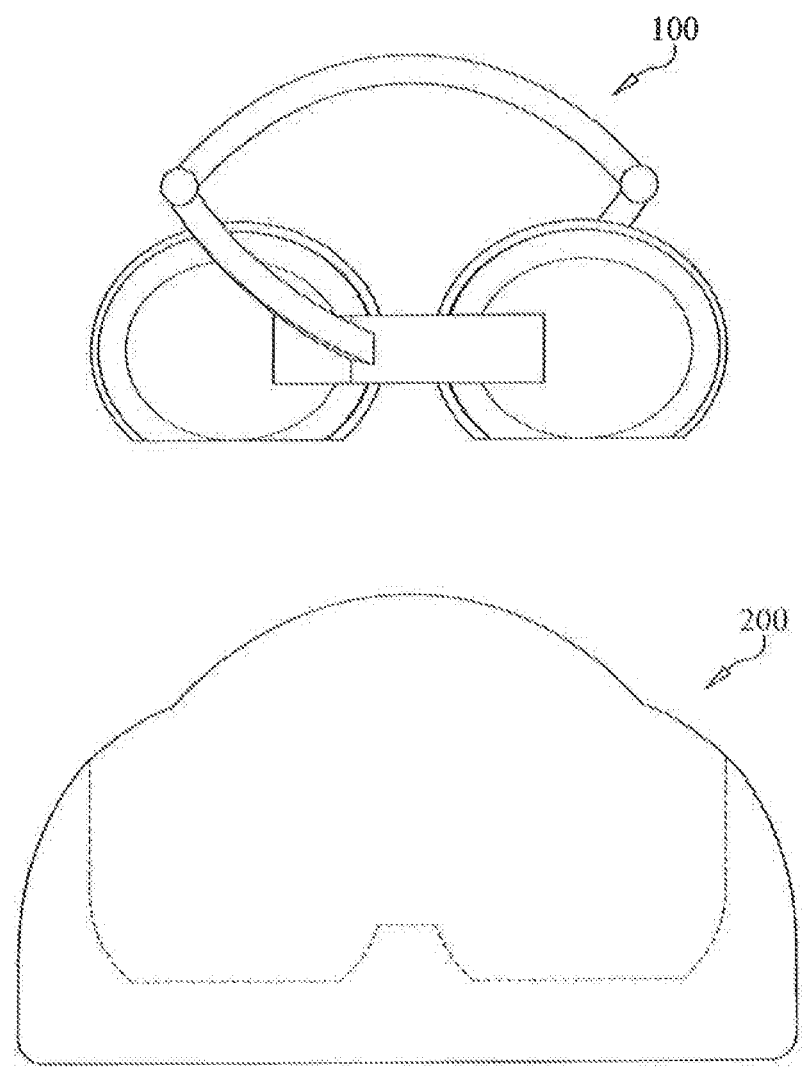
Figure 4F:
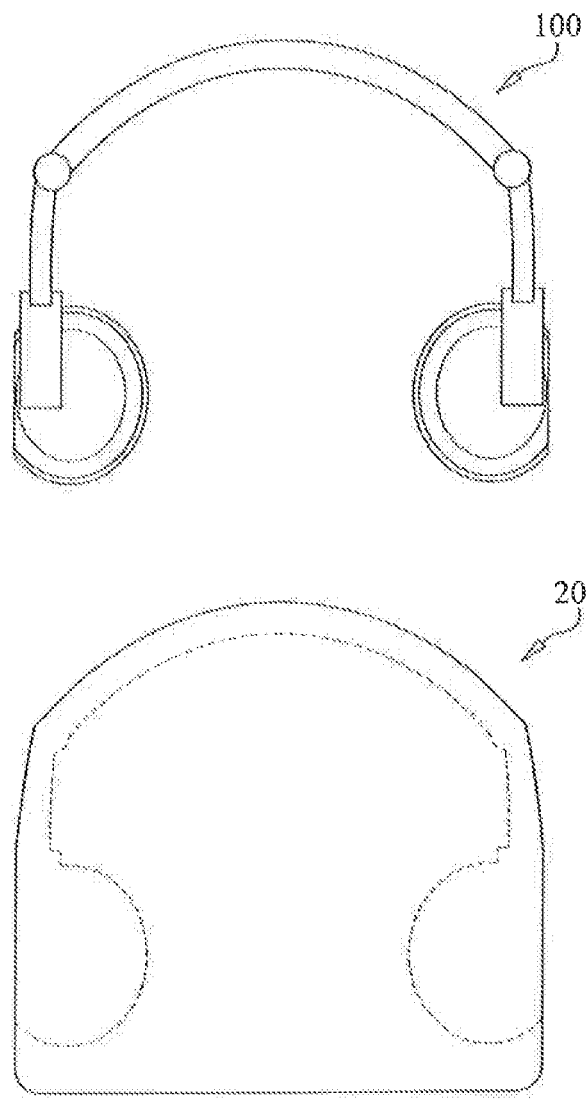

FIGS. 4D to 4F show a vehicle entertainment system including a headphones device and a vehicle headrest according to exemplary embodiments of the present invention.

As shown in FIGS. 4D to 4F, according to exemplary embodiments, the vehicle headrest 200 may be shaped and dimensioned to receive the headphones device 100 while the headphones device 100 is in a variety of configurations. For example, as shown in FIG. 4D, in an exemplary embodiment, the headphones device 100 may be docked in the vehicle headrest 200 while the headphones device 100 is in a standard (e.g., unfolded) position. As shown in FIG. 4E, in an exemplary embodiment, the headphones device 100 may be docked in the vehicle headrest 200 while the headphones device 100 is in a position in which the first and second speaker housings 101 and 102 are folded flat via the rotatable hinges 401 (as described above with reference to FIGS. 4A and 4B), and in which the first and second speaker housings 101 and 102 are folded inward via the first and second hinges 109 and 110 (as described above with reference to FIG. 4C). As shown in FIG. 4F, in an exemplary embodiment, the headphones device 100 may be docked in the vehicle headrest 200 while the headphones device 100 is in a position in which the first and second speaker housings 101 and 102 are folded flat via the rotatable hinges 401 (as described above with reference to FIGS. 4A and 4B).

In each of the configurations shown in FIGS. 4D to 4F, the headphones device 100 is substantially flush with the vehicle headrest 200 when the headphones device 100 is docked in the vehicle headrest 200. For example, when docked, the outer surface of the headband 103 is substantially flush with the outer surface of the vehicle headrest 200, the outer surface of the first speaker housing 101 is substantially flush with the outer surface of the vehicle headrest 200, and the outer surface of the second speaker housing 102 is substantially flush with the outer surface of the vehicle headrest 200. In exemplary embodiments, a portion (e.g., an outer side) of each speaker housing 101 and 102 is substantially flat, as shown in FIGS. 4C, 4E and 4F. Referring to FIG. 4F, the substantially flat portion of the speaker housings 101 and 102 allow the headphones device 100 to be substantially flush with the vehicle headrest 200 when docked in the folded position.

FIG. 5 shows a vehicle headrest of a vehicle entertainment system according to exemplary embodiments of the present invention.

As described above, the vehicle headrest 200 may be electrically connected to a power source of the vehicle. A power wire(s) and/or a data wire(s) 501 connecting the vehicle headrest 200 to the power source of the vehicle and/or a media source of the vehicle (e.g., a vehicle's radio, CD player, or other audio source mounted in, for example, the vehicle's console) may pass through the corresponding headrest post 502 and seat 503 (or via another route). The power wire(s) and/or the data wire(s) 501 may pass through a single headrest post 502 or multiple headrest posts 502. Audio data generated by a media source of the vehicle may be transmitted from the media source to the vehicle headrest 200 via the data wire(s) 501. The audio data may then be transmitted from the vehicle headrest 200 to the headphones device 100. In addition, in exemplary embodiments, video data may be transmitted via the data wire(s) 501. In exemplary embodiments, audio data may be transmitted from a media source of the vehicle to the headphones device 100 without first being transmitted to the vehicle headrest 200.

According to exemplary embodiments of the present invention, the vehicle headrest 200 includes a display screen 211 disposed on a rear surface of the main body portion 210 for presenting video content to a user. The vehicle headrest 200 may further include, for example, a speaker for providing audio content, and a wireless transceiver(s) (e.g., an infrared (IR) transceiver, a BLUETOOTH transceiver, a Wi-Fi transceiver, a cellular transceiver, etc.) that wirelessly provides audio content to the headphones device 100 and that optionally receives media content wirelessly from a remote video source. In an exemplary embodiment, the speaker included in the vehicle headrest 200 may be a speaker that is separate from the speakers 107 that are disposed on or near the inner sides of the speaker housings 101 and 102. Alternatively, in an exemplary embodiment, the speakers 107 that are disposed on or near the inner sides of the speaker housings 101 and 102 may be utilized to provide audio content to people in the vehicle while the headphones device 100 is docked in the vehicle headrest 200, as described in further detail below. The vehicle headrest 200 may include a variety of media sources and interfaces allowing for media input including, for example, an optical disc player (e.g., a DVD and/or CD-ROM player), a portable storage device interface(s) (e.g., a memory card slot such as an SD card slot, a microSD card slot, etc., a USB interface, a microUSB interface, an APPLE LIGHTNING interface, etc.), an HDMI interface, etc.

According to an exemplary embodiment of the present invention, the speakers 107 that are disposed on or near the inner sides of the speaker housings 101 and 102 may be utilized to provide audio content to people in the vehicle while the headphones device 100 is docked in the vehicle headrest 200. For example, the headphones device 100 may be toggled between a first audio mode (e.g., a single user audio mode) and a second audio mode (e.g., a multi-user audio mode). The audio content output by the speakers 107 has a relatively lower volume while in the single user audio mode compared to the multi-user audio mode. For example, the minimum and maximum volume levels in the single user audio mode are appropriate for a user consuming audio content while wearing the headphones device 100, and the minimum and maximum volume levels in the multi-user audio mode are higher than those in the first mode, and are appropriate for users consuming audio content in the vehicle while they are not wearing the headphones device 100.

The headphones device 100 may alternate between the single user audio mode and the multi-user audio mode using a variety of manners. For example, the headphones device 100 may include a button, toggle, or switch allowing a user to manually alternate between the single user audio mode and the multi-user audio mode. The headphones device 100 may include a motion sensor(s) that detects whether the headphones device 100 is currently being worn by a user, and the headphones device 100 may automatically alternate between the single user audio mode and the multi-user audio mode based on whether the headphones device 100 is currently being worn. The headphones device 100 may automatically alternate between the single user audio mode and the multi-user audio mode in response to a sensor(s) that indicates whether the headphones device 100 is currently docked in the vehicle headrest 200, and/or a wearable sensor(s) that indicates whether the headphones device 100 is currently being worn by a user.

Figure 8A:
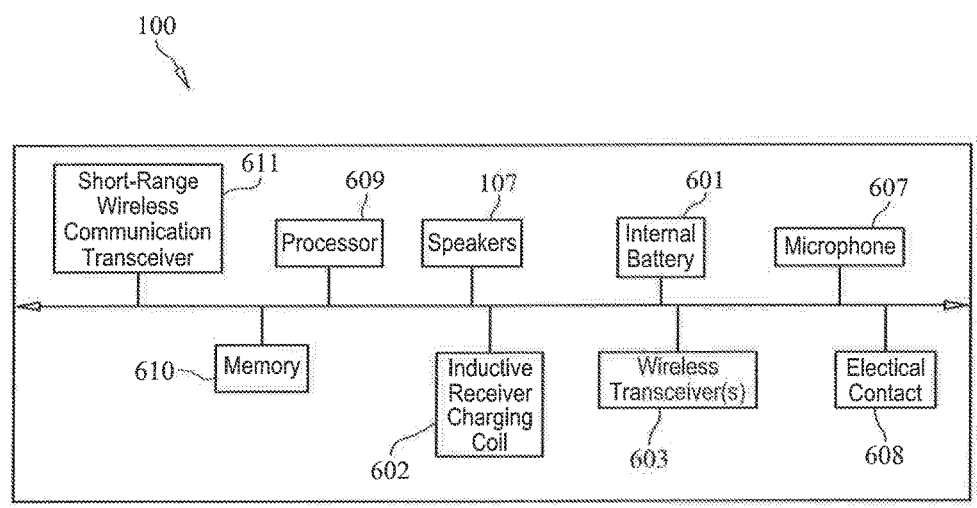
FIGS. 8A and 8B are block diagrams showing components included in a headphones device and a vehicle headrest according to exemplary embodiments of the present invention.

As described above, in exemplary embodiments, the vehicle headrest 200 may include a first electrical contact 613 (see FIG. 8B), and the headphones device 100 may include a second electrical contact 608 (see FIG. 8A). When the cooperating electrical contacts 613 and 608 are in contact with each other (e.g., because the headphones device 100 is docked in the vehicle headrest 200), the headphones device 100 may operate in the multi-user audio mode, and when the cooperating electrical contacts are not in contact with each other (e.g., because the headphones device is not docked in the vehicle headrest 200), the headphones device 100 may operate in the single user audio mode. For example, in an exemplary embodiment, the second cooperating electrical contact 608 (see FIG. 8A) may be disposed on the first speaker housing 101 of the headphones device 100, and the first cooperating electrical contact 613 (see FIG. 8B) may be disposed in the first recessed headphone indentation 205 of the vehicle headrest 200. When the headphones device 100 is docked in the vehicle headrest 200, the first and second cooperating electrical contacts 608 and 613 contact each other, causing the headphones device 100 to operate in the multi-user audio mode. When the headphones device 100 is not docked in the vehicle headrest 200, the first and second cooperating electrical contacts 608 and 613 do not contact each other, causing the headphones device 100 to operate in the single user audio mode. In an exemplary embodiment, the same electrical contacts may be used to both charge the headphones device 100 and to set the audio mode. In another exemplary embodiment, different electrical contacts may be respectively used to charge the headphones device 100 and to set the audio mode.

According to exemplary embodiments, the headphones device 100 and the vehicle headrest 200 may respectively include short-range wireless communication transceivers 611 and 614 (see FIGS. 8A and 8B) such as, for example, near-field communication (NFC) transceivers. The short-range wireless communication transceivers 611 and 614 may be used to detect whether the headphones device 100 is docked in the vehicle headrest 200, and the headphones device 100 may accordingly automatically alternate between the first and second audio modes in response to whether they are detected as being docked in the vehicle headrest 200. For example, in an exemplary embodiment, when the headphones device 100 is docked in the vehicle headrest 200, a wireless connection is established between the first and second short-range wireless communication transceivers 611 and 614, causing the headphones device 100 to operate in the multi-user audio mode. When the headphones device 100 is not docked in the vehicle headrest 200, a wireless connection is not established between the first and second short-range wireless communication transceivers 611 and 614, causing the headphones device 100 to operate in the single user audio mode.

As described above, the headphones device 100 and the vehicle headrest 200 may include inductive charging coils that wirelessly charge the headphones device 100. In an exemplary embodiment, the inductive charging coils may also be used to alternate between the first and second audio modes. For example, in an exemplary embodiment, the headphones device 100 operates in the single user audio mode when the inductive receiver charging coil 602 (see FIG. 8A) disposed in the headphones device 100 is not wirelessly coupled to the inductive transmitter charging coil 604 (see FIG. 8B) disposed in the vehicle headrest 200, and the headphones device 100 operates in the multi-user audio mode when the inductive receiver charging coil 602 disposed in the headphones device 100 is wirelessly coupled to the inductive transmitter charging coil 604 disposed in the vehicle headrest 200. Herein, the term "wirelessly coupled"

means that the inductive receiver charging coil 602 and the inductive transmitter charging coil 604 are close enough to each other such that wireless charging is possible (e.g., close enough to each other such that the headphones device 100 is currently being wirelessly charged, or if the headphones device 100 is currently fully charged, close enough to each other such that wireless charging may occur if needed).

Figure 6A:
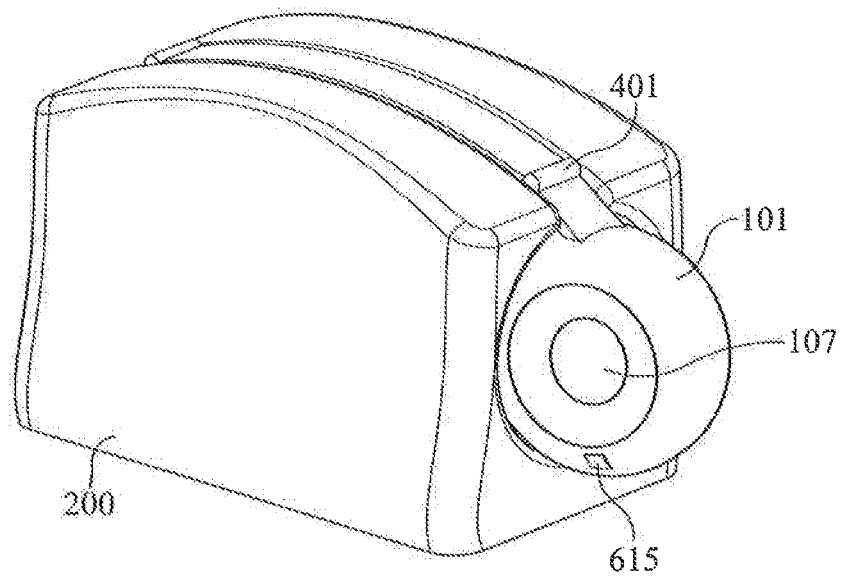
FIGS. 6A and 6B show a vehicle entertainment system including a headphones device and a vehicle headrest according to exemplary embodiments of the present invention.
Figure 6B:
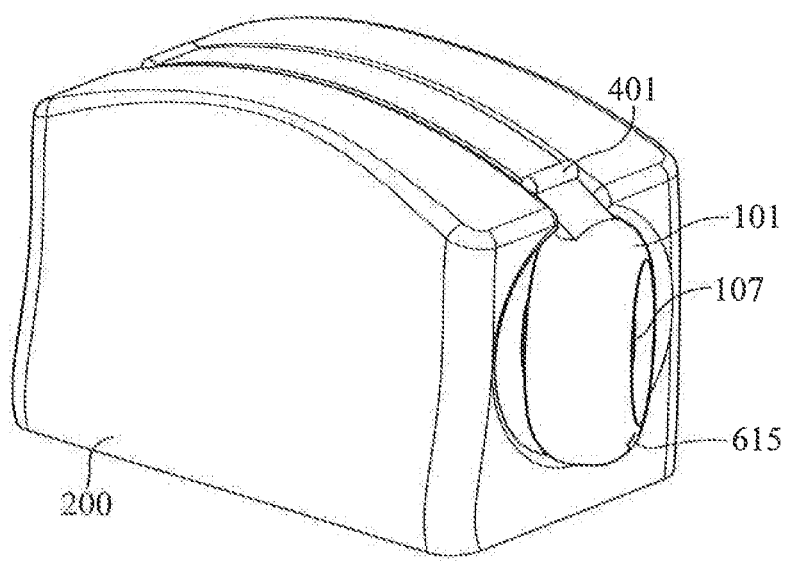

In exemplary embodiments of the present invention, the headphones device 100 may be docked in the vehicle headrest 200 such that the inner sides of the speaker housings 101 and 102 face outward when docked, as shown, for example, in FIGS. 3A and 6A-6B, allowing the audio content output by the speakers 107 of the headphones device 100 to be heard by multiple people in the vehicle (e.g., while the headphones device 100 is operating in the multi-user audio mode). The audio content output by the headphones device 100 may be, for example, audio content from the vehicle headrest 200. For example, as described above with reference to FIG. 5, the vehicle headrest 200 may include a display screen 211 for presenting video content to a user. Audio content corresponding to the video content presented on the display screen 211 may be output by the speakers 107 of the headphones device 100 while the headphones device 100 is docked in the vehicle headrest 200. The audio content may be transmitted wirelessly from the vehicle headrest 200 to the headphones device 100, or via a wired connection established between the vehicle headrest 200 and the headphones device 100. In an exemplary embodiment, the audio content may be transmitted via the cooperating electrical contacts 608 and 613 disposed on the headphones device 100 and the vehicle headrest 200. In an exemplary embodiment, the source of the video and audio content may disposed in the vehicle headrest 200. For example the source included in the vehicle headrest 200 may be a disc player such as a BLU-RAY, DVD or CD player, a memory device such as a hard drive or flash memory, or an input port that receives a memory device (e.g., a USB port, FIREWIRE port, etc.). In an exemplary embodiment, the vehicle headrest 200 may include a wireless transceiver such as a cellular transceiver that receives media content from a remote media source disposed external to the vehicle (e.g., a remote computer, a cloud server, etc.), and this media content may be transmitted to the headphones device 100 from the vehicle headrest 200 via a wired connection or a wireless connection.

In an exemplary embodiment of the present invention, a wireless connection may be established between the headphones device 100 and an electronic device functioning as a media source that is disposed remote from the headphones device 100 such as, for example, a cellular phone such as a smartphone, a laptop, a tablet computer, a portable gaming system, a media source mounted in the vehicle console, etc. The wireless connection may be established via, for example, a BLUETOOTH connection or a Wi-Fi connection. Thus, in exemplary embodiments, the headphones device 100 includes at least one wireless transceiver 603 (see FIG. 8A). The at least one wireless transceiver 603 may include, for example, a BLUETOOTH transceiver, a Wi-Fi transceiver, a cellular transceiver, an infrared (IR) transceiver, etc.

The at least one wireless transceiver 603 included in the headphones device 100 may receive audio content from a users' wireless device, such as a user's cellular phone (e.g., smartphone). As a result, any audio content output by the cellular phone may be transmitted to the headphones device 100 and played back via the speakers 107 of the headphones device 100. For example a cellular phone may be paired with the headphones device 100 via a BLUETOOTH connection, and audio content may be transmitted from the cellular phone to the headphones device 100 and played back by the headphones device 100. The audio content includes any audio content generated by the cellular phone including, but not limited to, music content, audio content corresponding to a video, audio content corresponding to a podcast, audio content corresponding to a video chat, etc.

In addition, phone call audio content may be transmitted from the cellular phone to the headphones device 100 and played back via the speakers 107 of the headphones device 100, allowing people in the vehicle to make and receive phone calls using a cellular phone and the headphones device 100. A microphone 607/612 may be included in the headphones device 100 and/or the vehicle headrest 200 (see FIGS. 8A and 8B), allowing people in the vehicle to make and receive phone calls using a hands-free implementation. For example, the microphone 607/612 may capture voice data and transmit the voice data to the cellular phone. Audio content transmitted from the cellular phone (or another electronic device) to the headphones device 100 may be played back in the single user audio mode or the multi-user audio mode.

When the headphones device is being operated in the multi-user audio mode, the headphones device 100 may be used in addition to other speakers (e.g., factory installed speakers) already installed in the vehicle, or instead of other speakers already installed in the vehicle. For example, audio content typically played back via factory installed speakers in the vehicle may be played back via the headphones device 100. For example, audio content from the vehicle's radio, the vehicle's CD player, or any other audio source installed in the vehicle may be played back via the headphones device 100. Such audio content may be played back via the headphone device 100 in the single-user audio mode or the multi-user audio mode.

As described above, in exemplary embodiments, the headphones device 100 may include rotatable hinges 401 that allow the first and second speaker housings 101 and 102 to rotate relative to the headband 103, as shown in FIGS. 4A and 4B. The rotation permitted by the rotatable hinges 401 may be up to a full 360 degrees. When the headphones device 100 is docked in the vehicle headrest 200, the speaker housings 101 and 102, which include the speakers 107, may be partially rotated forwards or backwards, allowing the direction of the speakers 107 to be adjusted, as shown in FIGS. 6A and 6B. For example, when people in the back of the vehicle are listening to audio output by the speakers 107 while the headphones device 100 is docked in the vehicle headrest 200, the speaker housings 101 and 102 may rotate to be tilted backward (see FIG. 6A) toward the rear of the vehicle, and when people in the front of the vehicle are listening to audio output by the speakers 107 while the headphones device 100 is docked in the vehicle headrest 200, the speaker housings 101 and 102 may rotate to be tilted forward (see FIG. 6B) toward the front of the vehicle. As a result, exemplary embodiments of the present invention allow the audio direction to be adjusted based on the location of the people consuming the audio content.

According to exemplary embodiments, components of the headphones device 100 such as, for example, electrical contacts and/or an inductive charging coil, may be disposed on the headphones device 100 such that they are aligned with cooperating components of the vehicle headrest 200 when the speaker housings 101 and 102 are titled forward or backward.

According to exemplary embodiments of the present invention, the speaker housings 101 and 102 that include the speakers 107 may be built into the vehicle headrest 200 instead of being part of a removable headphones device 100 that is docked in the vehicle headrest 200. That is, in exemplary embodiments, the speaker housings 101 and 102 that include the speakers 107 are integrally formed in the vehicle headrest 200 and are not removable from the vehicle headrest 200. For example, in an exemplary embodiment, the first speaker housing 101 is disposed in the first side surface 201 of the main body portion 210 of the vehicle headrest 200, and the second speaker housing 102 is disposed in the second side surface 202 of the main body portion 210 of the vehicle headrest 200.

Figure 7A:
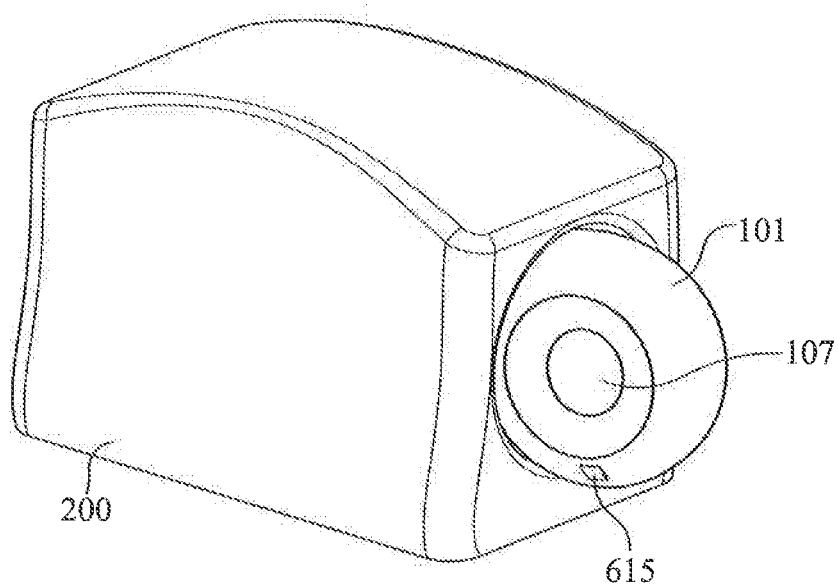
FIGS. 7A and 7B show a vehicle headrest including built-in speakers according to exemplary embodiments of the present invention.
Figure 7B:
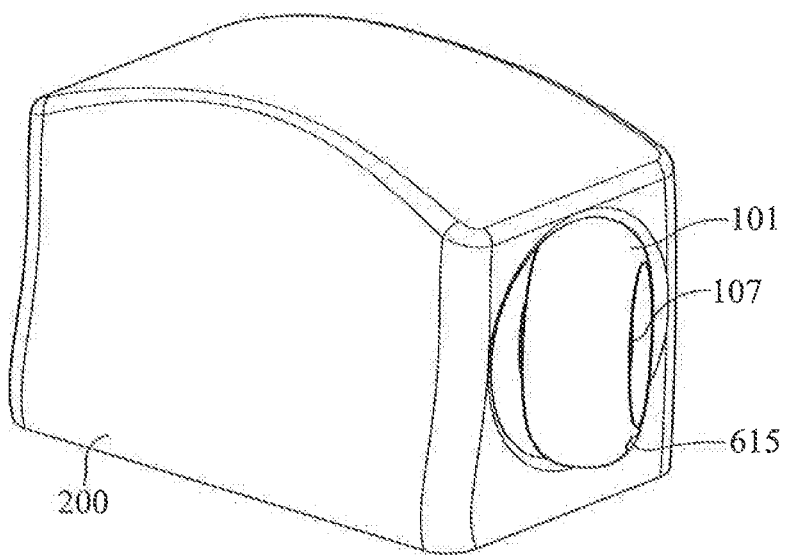

The built-in speakers 107 may be partially rotated forwards or backwards, allowing the direction of the speakers 107 to be adjusted, as shown in FIGS. 7A and 7B. For example, when people in the back of the vehicle are listening to audio output by the built-in speakers 107, the speaker housings 101 and 102 may be tilted backward (see FIG. 7A) to rotate toward the rear of the vehicle, and when people in the front of the vehicle are listening to audio output by the built-in speakers 107, the speaker housings 101 and 102 may be tilted forward (see FIG. 7B) to rotate toward the front of the vehicle.

According to exemplary embodiments, the speaker housings 101 and 102 may each be attached to an extending arm that extends into and out of the vehicle headrest 200. A rotatable hinge may connect the speaker housings 101 and 102 to the extending arms. In this embodiment, the speaker housings 101 and 102 may first extend out of the vehicle headrest 200 via the extending arms, and then be tilted forward or backward via the rotatable hinges connecting the speaker housings 101 and 102 to the extending arms.

According to exemplary embodiments, the vehicle headrest 200 may provide a variety of different audio sources that provide audio data to the headphones device 100. For example, the vehicle headrest 200 may include a USB port that receives a USB device functioning as the audio source, a memory card slot (e.g., an SD card slot, a microSD card slot, etc.) that receives a memory card functioning as the audio source, a built-in radio tuner (e.g., an AM/FM radio tuner, or a satellite radio tuner (e.g., a SIRIUSXM radio tuner)), or an HDMI port that receives an HDMI device functioning as the audio (and/or video) source. The audio (and/or video) may be transmitted from the vehicle headrest 200 to the headphones device 100 via a wireless connection, as described above, or via a wired connection. Exemplary embodiments of the vehicle headrest 200 may include one or more of these audio sources, and may or may not include a video screen. Such exemplary embodiments allow some people in the vehicle to consume different audio content (e.g., the audio content output by the vehicle headrest 200) than other people in the vehicle. For example, a driver may consume audio content output by the vehicle's built-in audio system, and a passenger(s) may consume audio content provided by the vehicle headrest 200.

Figure 8B:
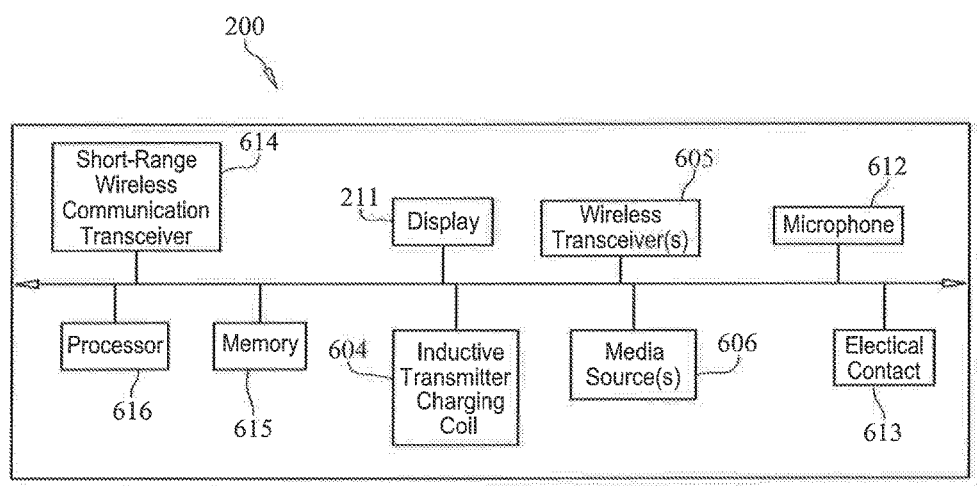

FIGS. 8A and 8B are block diagrams showing components included in a headphones device and a vehicle headrest according to exemplary embodiments of the present invention.

According to exemplary embodiments, the headphones device 100 and the vehicle headrest 200 may include some or all of the components illustrated in FIGS. 8A and 8B.

As shown in FIG. 8A, in an exemplary embodiment, the headphones device 100 includes speakers 107, an internal battery 601 that supplies power to the headphones device 100, an inductive receiver charging coil 602 that charges the internal battery 601, at least one wireless transceiver 603, a microphone 607, a first cooperating electrical contact 608, a processor 609, a memory 610, and/or a short-range wireless communication transceiver 611. The at least one wireless transceiver 603 may include, for example, an infrared (IR) transceiver, a BLUETOOTH transceiver, a Wi-Fi transceiver and/or a cellular transceiver. For example, according to exemplary embodiments, a BLUETOOTH transceiver or a Wi-Fi may wirelessly communicate audio data between an electronic device (e.g., a cellular phone such as a smartphone, a laptop, a tablet computer, a portable gaming system, etc.) and the headphones device 100, and/or wirelessly communicate audio data between the headphones device 100 and the vehicle headrest 200. The memory 610 may store a computer program executed by the processor 609 to implement functions of the headphones device 100 described herein, such as, for example, alternating between and operating in the single user audio mode and the multi-user audio mode. The processor may further control operation of the additional components disposed in the headphones device 100.

As shown in FIG. 6B, in an exemplary embodiment, the vehicle headrest 200 includes the display 211, an inductive transmitter charging coil 604 that charges the internal battery 601, at least one wireless transceiver 605, a microphone 612, a second cooperating electrical contact 613, a short-range wireless communication transceiver 614, a memory 615, and/or a processor 616. The at least one wireless transceiver 605 may include, for example, an infrared (IR) transceiver, a BLUETOOTH transceiver, a Wi-Fi transceiver and/or a cellular transceiver. For example, according to exemplary embodiments, a BLUETOOTH transceiver or a Wi-Fi transceiver may wirelessly communicate audio data between the vehicle headrest 200 and the headphones device 100, and a cellular transceiver may communicate audio and/or video data between the vehicle headrest 100 and a remote media source disposed external to the vehicle. The memory 615 may store a computer program executed by the processor 616 to implement functions of the vehicle headrest 200. The processor 616 may further control operation of the additional components disposed in the vehicle headrest 200. According to exemplary embodiments, any media device disposed remote from the headphones device 100 and remote from the vehicle headrest 200 described herein as transmitting audio content to the at least one wireless transceiver 603 disposed in the headphones device 100 may transmit audio content to the at least one wireless transceiver 605 disposed in the vehicle headrest 200.

Figure 9:
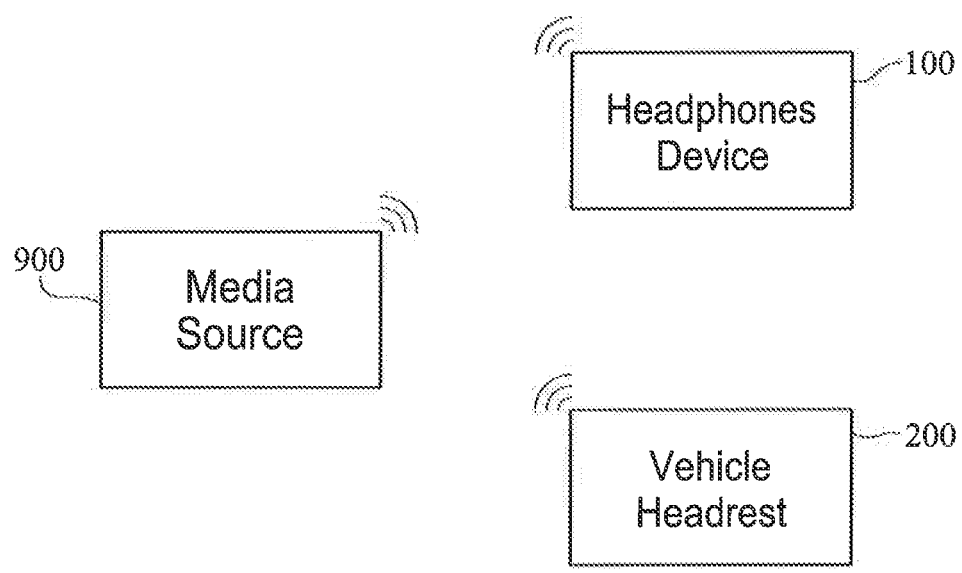
FIG. 9 is a block diagram illustrating wireless interaction between a headphones device, a vehicle headrest, and a media source, according to exemplary embodiments of the present invention.

FIG. 9 is a block diagram illustrating wireless interaction between a headphones device, a vehicle headrest, and a media source, according to exemplary embodiments of the present invention.

As described above, according to exemplary embodiments of the present invention, the headphones device 100 and/or the vehicle headrest 200 may include at least one wireless transceiver 603/605. The at least one wireless transceiver 603/605 may receive audio content from an electronic device functioning as a media source 900 that is disposed remote from the headphones device 100 and remote from the vehicle headrest 200. The electronic device functioning as a media source may be, for example, a cellular phone such as a smartphone, a laptop, a tablet computer, a portable gaming system, etc.

Having described exemplary embodiments for a vehicle entertainment system, it is noted that modifications and variations can be made by persons skilled in the art in light of the above teachings. It is therefore to be understood that changes may be made in exemplary embodiments of the invention, which are within the scope and spirit of the invention as defined by the appended claims. Having thus described the invention with the details and particularity required by the patent laws, what is claimed and desired protected by Letters Patent is set forth in the appended claims.

What is claimed is:

1. A vehicle entertainment system, comprising:
a headphones device, wherein the headphones device comprises:
a wireless transceiver configured to wirelessly receive audio content from a media source disposed remote from the headphones device;
a first speaker disposed in a first speaker housing;
a second speaker disposed in a second speaker housing;
a headband connecting the first speaker housing to the second speaker housing,
wherein the audio content is output by the first speaker and the second speaker;
a first rotatable hinge connecting the first speaker housing to the headband; and
a second rotatable hinge connecting the second speaker housing to the headband,
wherein the first speaker housing is configured to rotate toward a front of a vehicle and toward a rear of the vehicle via the first rotatable hinge while the headphones device is docked in a vehicle headrest, and the second speaker housing is configured to rotate toward the front of the vehicle and toward the rear of the vehicle via the second rotatable hinge while the headphones device is docked in the vehicle headrest; and
the vehicle headrest, wherein the vehicle headrest comprises:
a main body portion having a first side surface, a second side surface, and an upper surface extending from a first end of the first side surface to a first end of the second side surface;
a recessed channel disposed in the upper surface, the first side surface, and the second side surface of the main body portion, wherein the recessed channel is shaped and dimensioned to receive the headband of the headphones device;
a first recessed headphone indentation disposed in the first side surface of the main body portion, wherein the first recessed headphone indentation is shaped and dimensioned to receive the first speaker housing; and
a second recessed headphone indentation disposed in the second side of the main body portion, wherein the second recessed headphone indentation is shaped and dimensioned to receive the second speaker housing.

2. The vehicle entertainment system of claim 1, wherein the wireless transceiver is a BLUETOOTH transceiver, and the audio content is received from the media source via a BLUETOOTH connection established between the BLUETOOTH transceiver and the media source.

3. The vehicle entertainment system of claim 1,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode.

4. The vehicle entertainment system of claim 3, wherein the headphones device further comprises:
a button, wherein the headphones device is configured to alternate between the single user audio mode and the multi-user audio mode in response to the button being pressed.

5. A vehicle entertainment system, comprising:
a headphones device, wherein the headphones device comprises:
a first electrical contact disposed on the headphones device;
a wireless transceiver configured to wirelessly receive audio content from a media source disposed remote from the headphones device;
a first speaker disposed in a first speaker housing;
a second speaker disposed in a second speaker housing; and
a headband connecting the first speaker housing to the second speaker housing,
wherein the audio content is output by the first speaker and the second speaker; and
a vehicle headrest, wherein the vehicle headrest comprises:
a second electrical contact disposed on the vehicle headrest;
a main body portion having a first side surface, a second side surface, and an upper surface extending from a first end of the first side surface to a first end of the second side surface;
a recessed channel disposed in the upper surface, the first side surface, and the second side surface of the main body portion, wherein the recessed channel is shaped and dimensioned to receive the headband of the headphones device;
a first recessed headphone indentation disposed in the first side surface of the main body portion, wherein the first recessed headphone indentation is shaped and dimensioned to receive the first speaker housing; and
a second recessed headphone indentation disposed in the second side of the main body portion, wherein the second recessed headphone indentation is shaped and dimensioned to receive the second speaker housing,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the headphones device is configured to operate in the single user audio mode when the first and second electrical contacts are not in contact with each other, and operate in the multi-user audio mode when the first and second electrical contacts are in contact with each other.

6. A vehicle entertainment system, comprising:
a headphones device, wherein the headphones device comprises:
a first short-range wireless communication transceiver disposed in the headphones device;

a wireless transceiver configured to wirelessly receive audio content from a media source disposed remote from the headphones device;
a first speaker disposed in a first speaker housing;
a second speaker disposed in a second speaker housing; and
a headband connecting the first speaker housing to the second speaker housing,
wherein the audio content is output by the first speaker and the second speaker; and
a vehicle headrest, wherein the vehicle headrest comprises:
a second short-range wireless communication transceiver disposed in the vehicle headrest;
a main body portion having a first side surface, a second side surface, and an upper surface extending from a first end of the first side surface to a first end of the second side surface;
a recessed channel disposed in the upper surface, the first side surface, and the second side surface of the main body portion, wherein the recessed channel is shaped and dimensioned to receive the headband of the headphones device;
a first recessed headphone indentation disposed in the first side surface of the main body portion, wherein the first recessed headphone indentation is shaped and dimensioned to receive the first speaker housing; and
a second recessed headphone indentation disposed in the second side of the main body portion, wherein the second recessed headphone indentation is shaped and dimensioned to receive the second speaker housing,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the headphones device is configured to operate in the single user audio mode when a wireless connection is not established between the first and second short-range wireless communication transceivers, and operate in the multi-user audio mode when the wireless connection is established between the first and second short-range wireless communication transceivers.

7. A vehicle entertainment system, comprising:
a headphones device, wherein the headphones device comprises:
an internal battery;
an inductive receiver charging coil;
a wireless transceiver configured to wirelessly receive audio content from a media source disposed remote from the headphones device;
a first speaker disposed in a first speaker housing;
a second speaker disposed in a second speaker housing; and
a headband connecting the first speaker housing to the second speaker housing,
wherein the audio content is output by the first speaker and the second speaker; and
a vehicle headrest, wherein the vehicle headrest comprises:
a main body portion having a first side surface, a second side surface, and an upper surface extending from a first end of the first side surface to a first end of the second side surface;
an inductive transmitter charging coil disposed in the main body portion;
a recessed channel disposed in the upper surface, the first side surface, and the second side surface of the main body portion, wherein the recessed channel is shaped and dimensioned to receive the headband of the headphones device;
a first recessed headphone indentation disposed in the first side surface of the main body portion, wherein the first recessed headphone indentation is shaped and dimensioned to receive the first speaker housing; and
a second recessed headphone indentation disposed in the second side of the main body portion, wherein the second recessed headphone indentation is shaped and dimensioned to receive the second speaker housing,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the vehicle headrest is configured to electrically connect to a power source of a vehicle,
wherein the internal battery is wirelessly charged via the inductive transmitter charging coil and the inductive receiver charging coil in response to the headphones device being docked in the vehicle headrest.

8. The vehicle entertainment system of claim 7, wherein the headphones device is configured to operate in the single user audio mode when the inductive receiver charging coil is not wirelessly coupled to the inductive transmitter charging coil, and operate in the multi-user audio mode when the inductive receiver charging coil is wirelessly coupled to the inductive transmitter charging coil.

9. The vehicle entertainment system of claim 1, further comprising:
a microphone disposed in at least one of the headphones device or the vehicle headrest, wherein voice data is transmitted from the at least one of the headphones device or the vehicle headrest to the media source.

10. A vehicle entertainment system, comprising:
a headphones device, wherein the headphones device comprises:
a wireless transceiver configured to wirelessly receive audio content from a media source disposed remote from the headphones device;
a first speaker disposed in a first speaker housing;
a second speaker disposed in a second speaker housing;
a headband connecting the first speaker housing to the second speaker housing;
a first rotatable hinge connecting the first speaker housing to the headband; and
a second rotatable hinge connecting the second speaker housing to the headband,
wherein the first speaker housing is configured to rotate toward a front of a vehicle and toward a rear of the vehicle via the first rotatable hinge while headphones device is docked in a vehicle headrest, and the second speaker housing is configured to rotate toward the front of the vehicle and toward the rear of the vehicle via the second rotatable hinge while the headphones device is docked in the vehicle headrest,
wherein the audio content is output by the first speaker and the second speaker; and
the vehicle headrest comprising a recessed channel shaped and dimensioned to receive the headband, the first speaker housing, and the second speaker housing.

11. The vehicle entertainment system of claim 10, wherein a thickness of the headband is about equal to a depth of the recessed channel.

12. The vehicle entertainment system of claim 10, wherein an outer surface of the headband is substantially flush with an outer surface of the vehicle headrest while the headband is inserted into the recessed channel.

13. The vehicle entertainment system of claim 10,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode.

14. A vehicle entertainment system, comprising:
a headphones device, wherein the headphones device comprises:
 a first electrical contact disposed on the headphones device;
 a wireless transceiver configured to wirelessly receive audio content from a media source disposed remote from the headphones device;
 a first speaker disposed in a first speaker housing;
 a second speaker disposed in a second speaker housing; and
 a headband connecting the first speaker housing to the second speaker housing,
wherein the audio content is output by the first speaker and the second speaker; and
a vehicle headrest comprising a recessed channel shaped and dimensioned to receive the headband, the first speaker housing, and the second speaker housing,
wherein a second electrical contact is disposed on the vehicle headrest,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the headphones device is configured to operate in the single user audio mode when the first and second electrical contacts are not in contact with each other, and operate in the multi-user audio mode when the first and second electrical contacts are in contact with each other.

15. A vehicle entertainment system, comprising:
a headphones device, wherein the headphones device comprises:
 a first short-range wireless communication transceiver disposed in the headphones device;
 a wireless transceiver configured to wirelessly receive audio content from a media source disposed remote from the headphones device;
 a first speaker disposed in a first speaker housing;
 a second speaker disposed in a second speaker housing; and
 a headband connecting the first speaker housing to the second speaker housing,
wherein the audio content is output by the first speaker and the second speaker; and
a vehicle headrest comprising a recessed channel shaped and dimensioned to receive the headband, the first speaker housing, and the second speaker housing,
wherein a second short-range wireless communication transceiver is disposed in the vehicle headrest,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the headphones device is configured to operate in the single user audio mode when a wireless connection is not established between the first and second short-range wireless communication transceivers, and operate in the multi-user audio mode when the wireless connection is established between the first and second short-range wireless communication transceivers.

16. A vehicle entertainment system, comprising:
a headphones device, wherein the headphones device comprises:
 an internal battery;
 an inductive receiver charging coil;
 a wireless transceiver configured to wirelessly receive audio content from a media source disposed remote from the headphones device;
 a first speaker disposed in a first speaker housing;
 a second speaker disposed in a second speaker housing; and
 a headband connecting the first speaker housing to the second speaker housing,
wherein the audio content is output by the first speaker and the second speaker; and
a vehicle headrest comprising a recessed channel shaped and dimensioned to receive the headband, the first speaker housing, and the second speaker housing,
wherein the vehicle headrest is configured to electrically connect to a power source of a vehicle, and further comprises an inductive transmitter charging coil,
wherein the headphones device is configured to alternate between a single user audio mode and a multi-user audio mode,
wherein a minimum volume level and a maximum volume level at which the audio content is output by the first speaker and the second speaker are higher while in the multi-user audio mode than while in the single-user audio mode,
wherein the internal battery is wirelessly charged via the inductive transmitter charging coil and the inductive receiver charging coil in response to the headphones device being docked in the vehicle headrest,
wherein the headphones device is configured to operate in the single user audio mode when the inductive receiver charging coil is not wirelessly coupled to the inductive transmitter charging coil, and operate in the multi-user audio mode when the inductive receiver charging coil is wirelessly coupled to the inductive transmitter charging coil.

* * * * *